United States Patent
Sugawara et al.

(10) Patent No.: US 9,840,272 B2
(45) Date of Patent: Dec. 12, 2017

(54) ELECTRIC POWER STEERING APPARATUS (71) Applicant: NSK LTD., Tokyo (JP)

(72) Inventors: Takayoshi Sugawara, Tokyo (JP); Masahiro Maeda, Tokyo (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 15/312,075

(22) PCT Filed: Aug. 3, 2015

(86) PCT No.: PCT/JP2015/071910
§ 371 (c)(1),
(2) Date: Nov. 17, 2016

(87) PCT Pub. No.: WO2016/021526
PCT Pub. Date: Feb. 11, 2016

(65) Prior Publication Data
US 2017/0166243 A1 Jun. 15, 2017

(30) Foreign Application Priority Data
Aug. 8, 2014 (JP) .................................. 2014-162993

(51) Int. Cl.
*G06F 7/00* (2006.01)
*B62D 5/04* (2006.01)
(Continued)

(52) U.S. Cl.
CPC ............. *B62D 5/0463* (2013.01); *B62D 6/02* (2013.01); *B62D 6/10* (2013.01)

(58) Field of Classification Search
CPC ........... B62D 5/0463; B62D 6/02; B62D 6/10
(Continued)

(56) References Cited

U.S. PATENT DOCUMENTS 6,262,547 B1 * 7/2001 Kifuku .................. B62D 5/046
180/443
6,876,910 B2 * 4/2005 Kifuku ................ B62D 5/0466
180/443
(Continued)

FOREIGN PATENT DOCUMENTS

JP 2002-037109 A 2/2002
JP 3481468 B2 12/2003
(Continued)

OTHER PUBLICATIONS

International Search Report of PCT/JP2015/071910 dated Oct. 6, 2015 [PCT/ISA/210].
(Continued)

Primary Examiner — Muhammad Shafi
(74) Attorney, Agent, or Firm — Sughrue Mion, PLLC (57) ABSTRACT

An electric power steering apparatus that improves an on-center feeling while improving vehicle response by increasing a steering assist current in a torque range where a steering torque is equal to or less than a static friction torque of a reduction mechanism mainly so as to reduce a static friction uncomfortable feeling in the vicinity of on-center. The apparatus drive-controls a motor for providing a steering mechanism with a steering assist force using a current command value calculated based on at least a steering torque. The apparatus includes: a static friction compensating section that calculates a static friction compensation command value for compensating static friction of the steering mechanism based on the steering torque and a vehicle speed, wherein the current command value is corrected with the static friction compensation command value.

8 Claims, 8 Drawing Sheets (51) Int. Cl.
   *B62D 6/10*   (2006.01)
   *B62D 6/02*   (2006.01)
(58) Field of Classification Search
   USPC .............................................................. 701/4
   See application file for complete search history.

(56) References Cited

U.S. PATENT DOCUMENTS

| | | | |
|---|---|---|---|
| 7,136,732 B2* | 11/2006 | Shimizu | B62D 5/0463 |
| | | | 180/417 |
| 8,798,862 B2* | 8/2014 | Oniwa | B62D 5/0463 |
| | | | 180/6.2 |
| 2002/0026267 A1* | 2/2002 | Kifuku | B62D 5/0466 |
| | | | 701/41 |
| 2011/0276229 A1 | 11/2011 | Sugawara et al. | |

FOREIGN PATENT DOCUMENTS

| | | | |
|---|---|---|---|
| JP | 2007-118794 A | 5/2007 | |
| JP | 2013-159240 A | 8/2013 | |
| WO | 2010/087295 A1 | 8/2010 | |

OTHER PUBLICATIONS

International Preliminary Report on Patentability of PCT/JP2015/071910 dated Jul. 14, 2016[PCT/IPEA/409].

\* cited by examiner

FIG.1

PRIOR ART

FIG.5(A) IN THE CASE OF wa1

FIG.5(B) IN THE CASE OF wa2

FIG.5(C) IN THE CASE OF wa4

FIG.5(D) IN THE CASE OF wa8

FIG.5(E) IN THE CASE OF wa16

TIME

ELECTRIC POWER STEERING APPARATUS

CROSS REFERENCE TO RELATED APPLICATIONS

This application is a National Stage of International Application No. PCT/JP2015/071910, filed Aug. 3, 2015, claiming priority based on Japanese Patent Application No. 2014-162993, filed Aug. 8, 2014, the contents of all of which are incorporated herein by reference in their entirety.

TECHNICAL FIELD

The present invention relates to an electric power steering apparatus that drive-controls a motor by means of a current command value calculated based on at least a steering torque and provides a steering mechanism of a vehicle with a steering assist force generated by the motor through a reduction mechanism, and in particular to an electric power steering apparatus that improves a steering feeling in the vicinity of on-center (hereinafter, also referred to as "an on-center feeling") while suppressing a non-linear uncomfortable feeling (a non-linear steering feeling) caused by static friction existing in the steering mechanism to occur in a micro steering torque range in the vicinity of on-center (hereinafter, also referred to as "static friction of the steering mechanism" or "the static friction").

BACKGROUND ART

An electric power steering apparatus which provides a steering mechanism of a vehicle with a steering assist force (an assist force) by means of a rotational force of a motor, applies a driving force of the motor as the steering assist force to a steering shaft or a rack shaft by means of a transmission mechanism such as gears or a belt through the reduction mechanism. In order to accurately generate a torque as the steering assist force, such a conventional electric power steering apparatus (EPS) performs a feedback control of a motor current. The feedback control adjusts a voltage supplied to the motor so that a difference between a steering assist command value (a current command value) and a motor current detection value becomes small, and the adjustment of the voltage applied to the motor is generally performed by an adjustment of duty command values of a PWM (Pulse Width Modulation) control.

Figure 1:
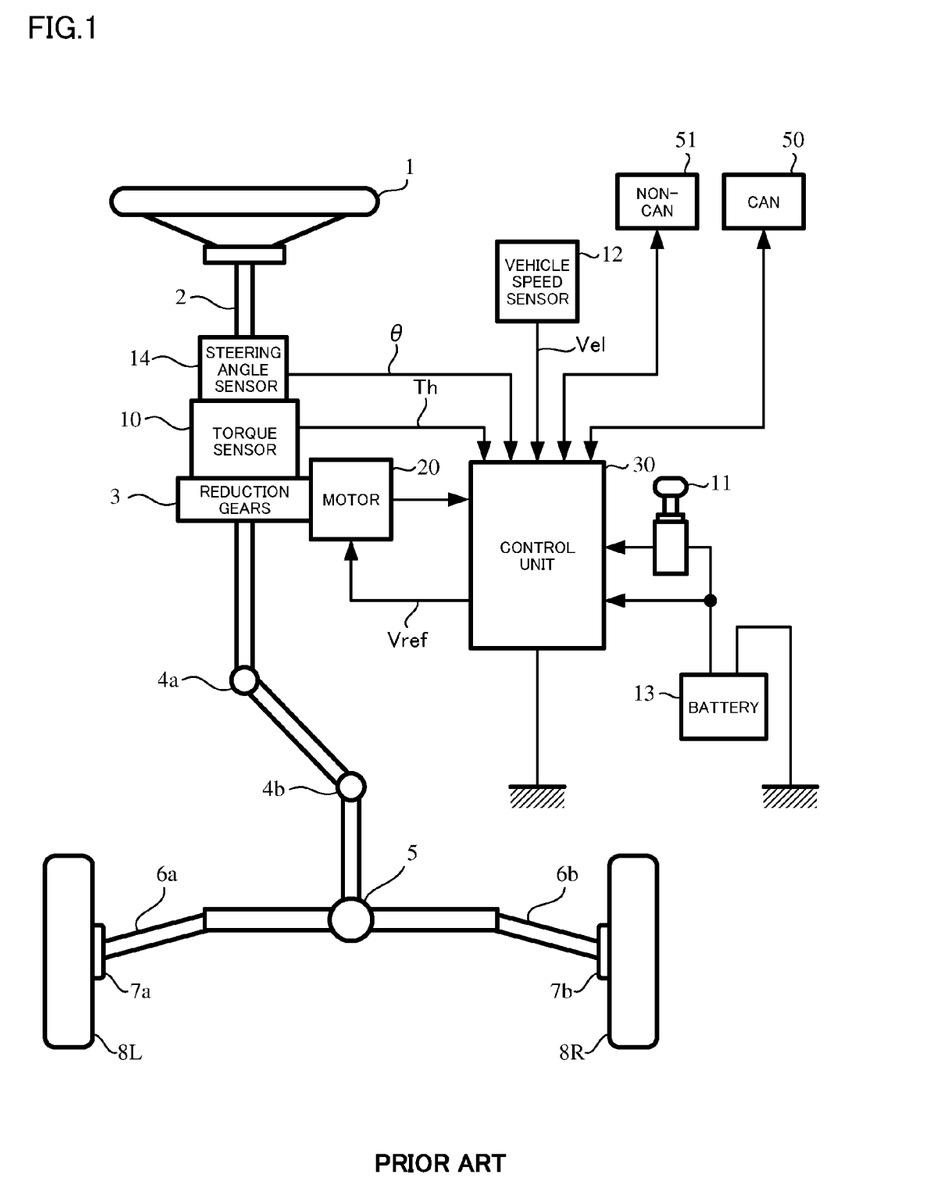
FIG. 1 is a configuration diagram illustrating a general outline of an electric power steering apparatus.

A general configuration of the conventional electric power steering apparatus will be described with reference to FIG. 1. As shown in FIG. 1, a column shaft (a steering shaft or a handle shaft) 2 connected to a steering wheel 1, is connected to steered wheels 8L and 8R through reduction gears 3 of the reduction mechanism, universal joints 4a and 4b, a rack and pinion mechanism 5, and tie rods 6a and 6b, further via hub units 7a and 7b. Further, the column shaft 2 is provided with a torque sensor 10 for detecting a steering torque of the steering wheel 1 and a steering angle sensor 14 for detecting a steering angle θ, and a motor 20 for assisting a steering force of the steering wheel 1 is connected to the column shaft 2 through the reduction gears (a gear ratio n) 3 of the reduction mechanism. Electric power is supplied to a control unit (ECU) 30 for controlling the electric power steering apparatus from a battery 13, and an ignition key signal is inputted into the control unit 30 through an ignition key 11. The control unit 30 calculates a current command value of an assist (steering assist) command on the basis of a steering torque Th detected by the torque sensor 10 and a vehicle speed Vel detected by a vehicle speed sensor 12, and controls a current supplied to the motor 20 on the basis of a voltage control command value Vref obtained by performing a compensation and so on with respect to the current command value. Moreover, the steering angle sensor 14 is optional and it may not be arranged.

A CAN (Controller Area Network) 50 for transmitting and receiving various kinds of information about the vehicle is connected to the control unit 30, and it is also possible to receive the vehicle speed Vel from the CAN 50. Further, a non-CAN 51 for transmitting and receiving communications, analog/digital signals, radio waves, etc. except for the CAN 50 is also connected to the control unit 30.

Figure 2:
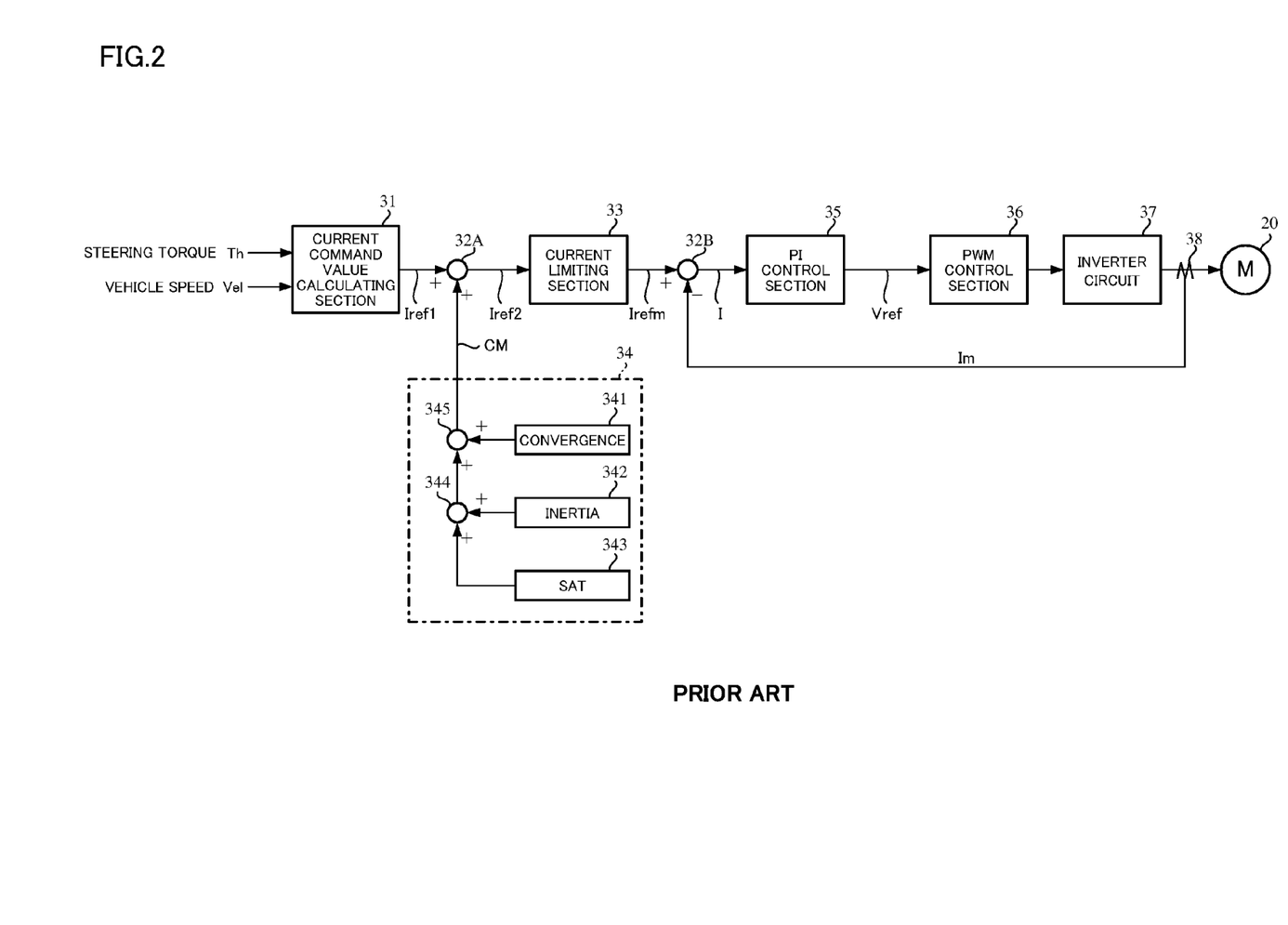
FIG. 2 is a block diagram showing a configuration example of a control system of the electric power steering apparatus.

The control unit 30 mainly comprises a CPU (also including an MPU, an MCU, or the like), and general functions performed by programs within the CPU are shown in FIG. 2.

Functions and operations of the control unit 30 will be described with reference to FIG. 2. As shown in FIG. 2, the steering torque Th detected by the torque sensor 10 and the vehicle speed Vel detected by the vehicle speed sensor 12 (or from the CAN 50) are inputted into a current command value calculating section 31 for calculating a current command value Iref1. The current command value calculating section 31 calculates the current command value Iref1 that is a control target value of a current supplied to the motor 20 based on the steering torque Th being inputted and the vehicle speed Vel being inputted and by means of an assist map or the like. The current command value Iref1 is inputted into a current limiting section 33 through an adding section 32A. A current command value Irefm that a maximum current is limited, is inputted into a subtracting section 32B, and a deviation I (Irefm-Im) between the current command value Irefm and a motor current value Im being fed back, is calculated. The deviation I is inputted into a PI control (Proportional-Integral control) section 35 for characteristic improvement of steering operations. A voltage control command value Vref that the characteristic is improved by the PI control section 35, is inputted into a PWM control section 36. Furthermore, the motor 20 is PWM-driven through an inverter circuit 37 serving as a driving section. The current value Im of the motor 20 is detected by a motor current detector 38 and fed back to the subtracting section 32B. The inverter circuit 37 uses FETs as driving elements and is comprised of a bridge circuit of FETs.

A compensation signal CM from a compensation signal generating section 34 is added in the adding section 32A, and a characteristic compensation of a steering system is performed by the addition of the compensation signal CM so as to improve a convergence, an inertia characteristic and so on. The compensation signal generating section 34 adds a self-aligning torque (SAT) 343 and an inertia 342 in an adding section 344, further, adds the result of addition performed in the adding section 344 and a convergence 341 in an adding section 345, and then outputs the result of addition performed in the adding section 345 as the compensation signal CM.

As described above, such the electric power steering apparatus drive-controls the motor based on the current command value calculated on the basis of the steering torque inputted by a driver and the vehicle speed and provides the steering mechanism with the steering assist force generated by the motor through the reduction mechanism. Since the static friction exists in the steering mechanism due to friction of the motor itself, friction of the reduction mechanism, friction of a suspension and so on, the electric power steering apparatus is largely affected by the static friction of the steering mechanism.

Since the static friction of the steering mechanism is not taken into consideration in the conventional electric power steering apparatus, there is a problem that a feeling of being caught or the like due to the influence of this static friction of the steering mechanism occurs for example when the driver begins to steer, and the steering feeling in the vicinity of on-center (in the vicinity of a neutral position of the steering wheel), i.e. the on-center feeling gets worse.

In order to solve the above problem, for example, an electric power steering apparatus disclosed in Japanese Patent No. 3481468 (Patent Document 1) that improves the steering feeling by estimating static friction of the steering system and then compensating the estimated static friction, and an electric power steering apparatus disclosed in Japanese Patent No. 4852975 (Patent Document 2) that compensates a mechanical or electromagnetic loss torque so as to improve the on-center feeling of the steering wheel are proposed.

The electric power steering apparatus disclosed in Patent Document 1 calculates a static friction estimation value of the steering system based on the steering torque from the torque sensor and by means of a static friction calculating means, concretely, detects an increase in the steering torque caused by the static friction that occurs when the driver begins to steer and estimates the static friction of the steering system by focusing attention on a fact (a phenomenon) that "in the case that the static friction of the steering system is large even though being a steering angle by which the steering wheel (the handle) hardly moves, as a result, the steering torque increases, and in the case that the steering torque increases due to the influence of the static friction, a change in the steering torque is steep in comparison with after the motor begins to rotate and the steering angle begins to change", and extracting a steering torque detection value of a part where the steering torque detection value shows a steep change.

Further, the electric power steering apparatus disclosed in Patent Document 2 calculates a friction weak field current which is a friction compensation value from a friction compensation calculation section and adds the weak field current to a d-axis current command value for controlling the strength of a magnetic field. In other words, the electric power steering apparatus disclosed in Patent Document 2 tends to be a configuration that compensates the loss torque with respect to a friction loss based on the structure of the motor and a loss based on an electromagnetic factor.

THE LIST OF PRIOR ART DOCUMENTS

Patent Documents

Patent Document 1: Japanese Patent No. 3481468
Patent Document 2: Japanese Patent No. 4852975

SUMMARY OF THE INVENTION

Problems to be Solved by the Invention

In the conventional electric power steering apparatus, in the micro steering torque range in the vicinity of on-center, due to the influence of assist characteristics that take into consideration the offset error of the torque sensor etc., it is impossible to apply an enough assist current (a steering assist current). Hence, there is a problem that the electric power steering apparatus is largely affected by the static friction that the steering mechanism has, and in particular, as a static friction feeling (an adhesive feeling or the like) that occurs at the moment of starting to turn the steering wheel and at the moment of returning the steering wheel in the micro steering torque range in the vicinity of on-center, the driver feels the non-linear steering feeling.

In the case that the steering torque is less than a static friction torque of the reduction mechanism, for example, in the case that the static friction torque of the reduction mechanism is about 0.7 Nm and the steering torque is less than about 0.7 Nm, only a steering wheel side moves, on the other hand, a reduction mechanism side is in a stationary state without moving due to the static friction. In this state, the vehicle also does not respond obviously. However, when the steering torque begins to exceed the static friction torque (for example, when the steering torque begins to exceed about 0.7 Nm), since the reduction mechanism side also begins to move, although the vehicle also begins to respond, since a point of time when the steering torque becomes equal to the static friction torque of the reduction mechanism (for example, since a point of time when the steering torque becomes equal to in the vicinity of about 0.7 Nm), the reduction mechanism side becomes having a border of moving or not moving, hence the vehicle becomes a vehicle behavior of sometimes drastically responding and sometimes not, as a result, a problem of becoming the non-linear steering feeling occurs. Furthermore, the static friction torque varies depending on conditions of the vehicle and external environment and is not limited to 0.7 Nm.

Further, in the electric power steering apparatus disclosed in Patent Document 1, although it is possible to estimate the static friction of the steering system by extracting the steep change in the steering torque detection value, there is a problem that the accuracy of the static friction estimation value and an uncomfortable feeling (a loose feeling) in a steering speed range where the steering wheel (the handle) is fast cannot be improved completely.

Moreover, in the electric power steering apparatus disclosed in Patent Document 2, there is a problem that as the static friction feeling (the adhesive feeling or the like) that occurs at the moment of starting to turn the steering wheel and at the moment of returning the steering wheel in the micro steering torque range in the vicinity of on-center, the driver feels the non-linear steering feeling.

The present invention has been developed in view of the above-described circumstances, and the object of the present invention is to provide an electric power steering apparatus that improves the on-center feeling while improving vehicle response (movement of the reduction mechanism side) by increasing the steering assist current in a torque range where the steering torque is equal to or less than the static friction torque of the reduction mechanism mainly so as to reduce that the vehicle behavior drastically varies in the vicinity where the steering torque matches with the static friction torque of the reduction mechanism (i.e. so as to reduce a friction feeling in the vicinity of on-center, in particular, a static friction uncomfortable feeling in the vicinity of on-center).

Means for Solving the Problems

The present invention relates to an electric power steering apparatus that drive-controls a motor for providing a steering mechanism with a steering assist force by means of a current command value calculated based on at least a steering torque, the above-described object of the present invention is achieved by that comprising: a static friction compensating section that calculates a static friction compensation command value for compensating static friction of said steering mechanism based on said steering torque which is a steering torque within a micro steering torque range in the vicinity of on-center and a vehicle speed, wherein said current command value is corrected with said static friction compensation command value; or comprising: a static friction compensating section that calculates a static friction compensation command value for compensating static friction of said steering mechanism based on said steering torque which belongs to a torque range being equal to or less than a static friction torque of a reduction mechanism and a vehicle speed, wherein said current command value is corrected with said static friction compensation command value.

Further, the above-described object of the present invention is more effectively achieved by that wherein said static friction compensating section comprises a vehicle speed sensitive gain section that calculates a vehicle speed sensitive gain to be decided depending on said vehicle speed and a steering torque change rate extracting section that extracts a steering torque change rate based on said steering torque, and multiplies said vehicle speed sensitive gain calculated by said vehicle speed sensitive gain section by said steering torque change rate extracted by said steering torque change rate extracting section to generate said static friction compensation command value; or wherein said steering torque change rate extracting section obtains a weighted average steering torque by weighted-averaging said steering torque, calculates a difference between said steering torque and obtained said weighted average steering torque, and sets calculated said difference as said steering torque change rate; or wherein said steering torque change rate extracting section tunes a rate of weighted-averaging so as to be capable of selecting a gradient of a steering torque change rate desired to be extracted in accordance with characteristics of a vehicle and a column shaft; or wherein said vehicle speed sensitive gain section sets said vehicle speed sensitive gain in accordance with said vehicle speed so as to be capable of adjusting a vehicle response due to a vehicle speed difference, a friction feeling and a steering feeling.

Effects of the Invention

According to the electric power steering apparatus of the present invention, since a static friction compensating section 40 comprises a steering torque change rate extracting section 41 capable of tuning a weighted-averaging rate and a vehicle speed sensitive gain section 42 capable of setting a gain corresponding to the vehicle speed (a vehicle speed sensitive gain Gv), it is possible to select a gradient (a frequency) of a steering torque change rate desired to be extracted in accordance with characteristics of the vehicle and the column shaft, and concurrently it is possible to adjust the vehicle response due to a vehicle speed difference, the friction feeling and the steering feeling.

Further, according to the present invention, it is possible to improve the on-center feeling while suppressing an uncomfortable feeling that a conventional on-center responsiveness improving section had (i.e. the static friction uncomfortable feeling in the vicinity of on-center).

Moreover, according to the present invention, it is possible to obtain an effect that apparent friction decreased when returning the steering wheel by beginning to output a static friction compensation command value (a static friction compensation value) SCC from a point of time when detecting a micro steering torque input in a state that the rotation of the motor is stopped. Further, according to the present invention, it is possible to obtain the same effect not only when returning the steering wheel but also when turning the steering wheel.

BRIEF DESCRIPTION OF THE DRAWINGS

In the accompanying drawings.

MODE FOR CARRYING OUT THE INVENTION

The present invention relates to an electric power steering apparatus that improves the on-center feeling while suppressing the non-linear steering feeling (hereinafter, also referred to as "the static friction uncomfortable feeling in the vicinity of on-center") caused by the static friction existing in the steering mechanism to occur in the micro steering torque range in the vicinity of on-center.

That is to say, in order to reduce "the static friction feeling that occurs at the moment of starting to turn the steering wheel and at the moment of returning the steering wheel in the micro steering torque range in the vicinity of on-center" which is mentioned as the problem to be solved by the present invention, i.e. in order to reduce that the vehicle behavior drastically varies in the vicinity where the steering torque matches with the static friction torque of the reduction mechanism, since the present invention corrects a current command value for steering assist with a static friction compensation command value (a static friction compensation value) SCC which is calculated by means of a static friction compensating section and on the basis of a vehicle speed and a steering torque in the torque range where the steering torque is equal to or less than the static friction torque of the reduction mechanism mainly (in the micro steering torque range in the vicinity of on-center) so as to perform a static friction compensation and drive the motor by means of the corrected current command value, consequently, it becomes possible to apply an enough steering assist current which is obtained by increasing a steering assist current obtained in a conventional electric power steering apparatus in which the static friction compensation is not taken into consideration to the motor, and concurrently it is possible to improve the on-center feeling while improving the vehicle response (the movement of the reduction mechanism side).

Hereinafter, a concrete embodiment of the present invention will be described in detail with reference to the drawings.

Figure 3:
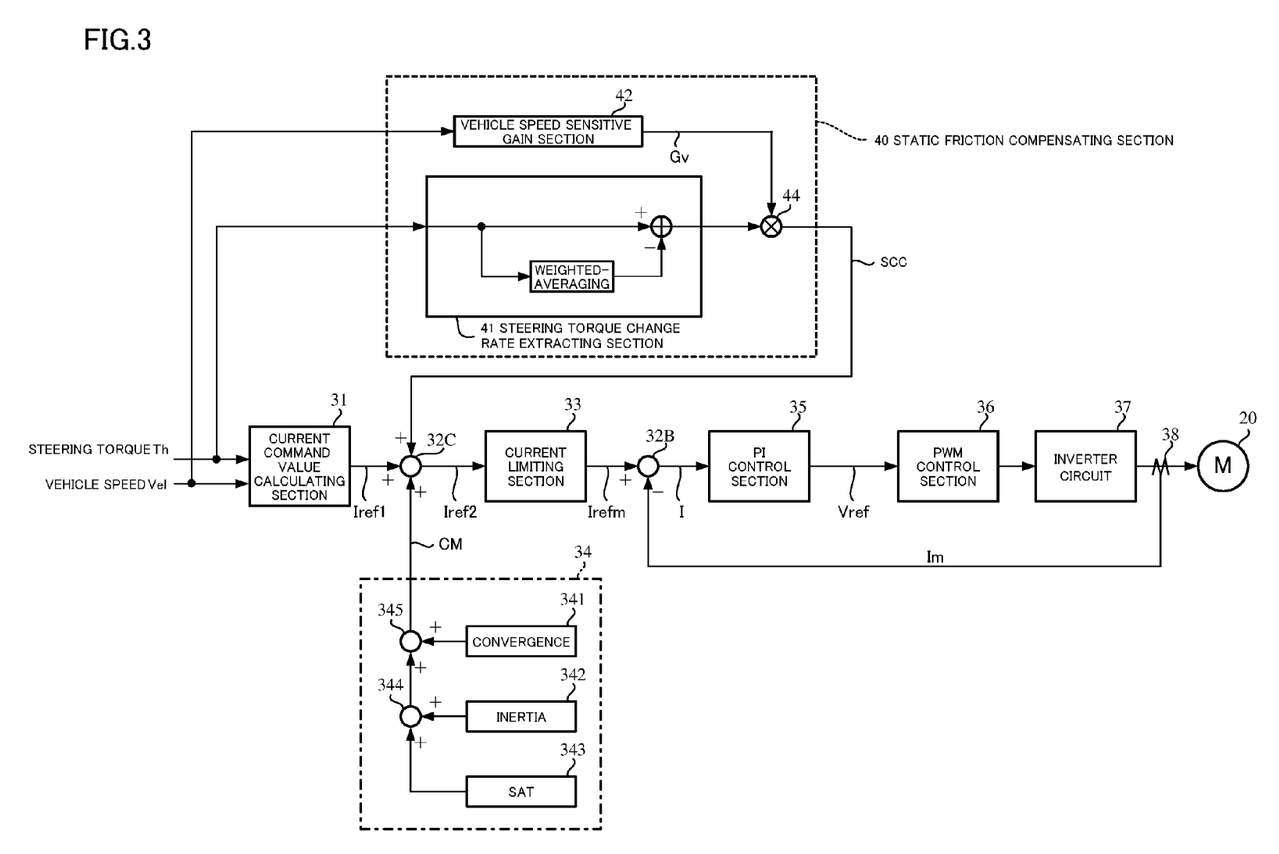
FIG. 3 is a block diagram showing a configuration example of the present invention.

FIG. 3 corresponding to FIG. 2 shows a configuration example of the present invention. As shown in FIG. 3, the present invention newly adds a static friction compensating section 40, addition-inputs the static friction compensation command value (the static friction compensation value) SCC which is calculated by the static friction compensating section 40 and on the basis of the steering torque Th and the vehicle speed Vel into an adding section 32C and then corrects the current command value Iref1 with the static friction compensation command value (the static friction compensation value) SCC so as to compensate the static friction. That is to say, the present invention addition-inputs the current command value Iref1 and the compensation signal CM into the adding section 32C and concurrently addition-inputs the static friction compensation command value SCC calculated by the static friction compensating section 40 into the adding section 32C and then corrects the current command value Iref1 described above with the static friction compensation command value SCC so as to obtain a current command value Iref2. Operations after the current command value Iref2 are the same as the case of FIG. 2 described above.

Further, in the present invention, the compensation based on the compensation signal CM from the compensation signal generating section 34 is optional.

The static friction compensating section 40 comprises a steering torque change rate extracting section 41 for extracting a steering torque change rate, a vehicle speed sensitive gain section 42 for calculating a vehicle speed sensitive gain and a multiplying section 44, and calculates the static friction compensation command value (the static friction compensation value) SCC on the basis of the steering torque and the vehicle speed.

The steering torque change rate as referred to in the present invention means a differential component of the steering torque Th or a differential value of the steering torque Th. Hereinafter, the steering torque change rate is also simply referred to as "a differential of the steering torque". Further, the multiplying section 44 outputs the static friction compensation command value (the static friction compensation value) SCC obtained by multiplying the steering torque change rate outputted from the steering torque change rate extracting section 41 by a vehicle speed sensitive gain Gv outputted from the vehicle speed sensitive gain section 42 to the adding section 32C.

The steering torque change rate extracting section 41 inputs the steering torque Th, obtains a weighted average value of the steering torque (hereinafter, also referred to as "a weighted average steering torque") by weighted-averaging the inputted steering torque Th, calculates a difference between the inputted steering torque Th and the obtained weighted average steering torque, and outputs the calculated difference as the steering torque change rate to the multiplying section 44. According to the steering torque change rate extracting section 41 of the present invention, it is possible to effectively extract arbitrary steering torque change rate (even a micro change in the steering torque) from a steering torque signal (the steering torque Th) detected by the torque sensor 10.

Moreover, in the steering torque change rate extracting section 41 of the present invention, as substitute for a weighted-averaging processing which is performed with respect to the steering torque Th, it is also possible to perform a low-pass filtering processing with respect to the inputted steering torque Th. In this case, the steering torque change rate extracting section 41 calculates a difference between the inputted steering torque Th and the steering torque after the low-pass filtering processing and then outputs the said calculated difference as the steering torque change rate to the multiplying section 44.

Figure 4:
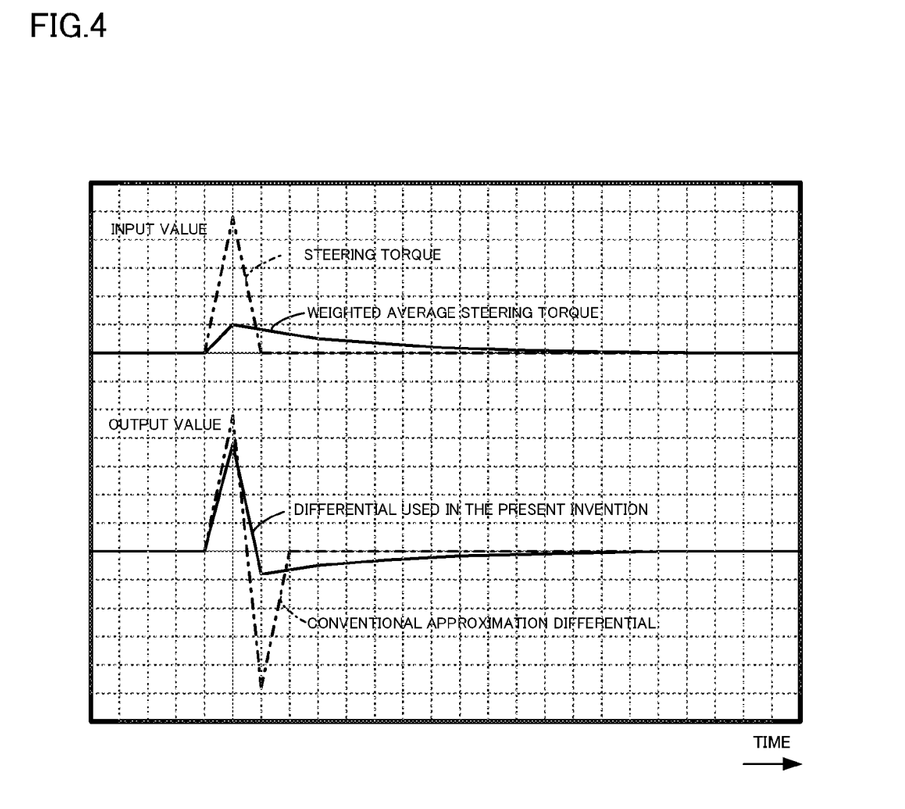
FIG. 4 is a graph showing a waveform example of an input signal and an output signal of a steering torque change rate extracting section according to the present invention.
Figure 5A:
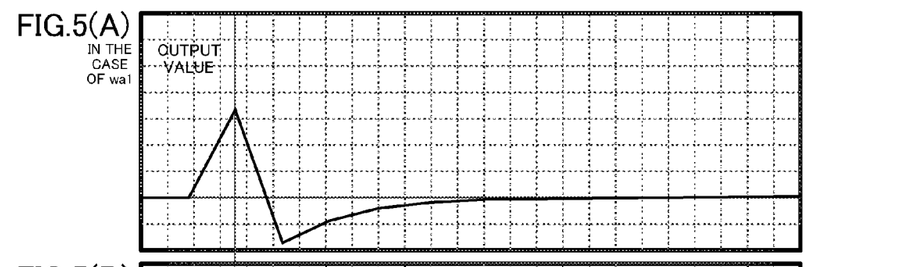
FIGS. 5(A), 5(B), 5(C), 5(D) and 5(E) are graphs showing waveform examples of the output signal based on different weighted-averaging rates (i.e. weighted-averaging rates wa1, wa2, wa4, wa8 and wa16) in the steering torque change rate extracting section according to the present invention.
Figure 5B:
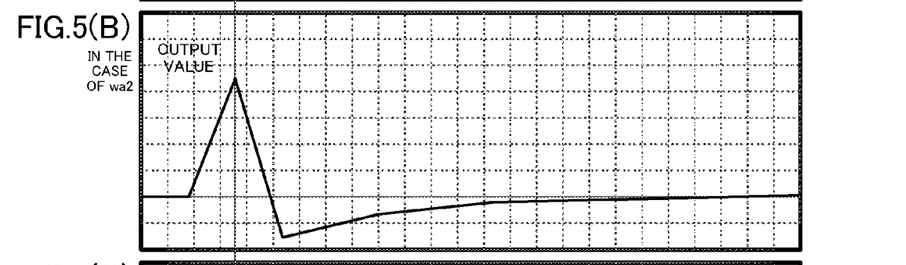
Figure 5C:
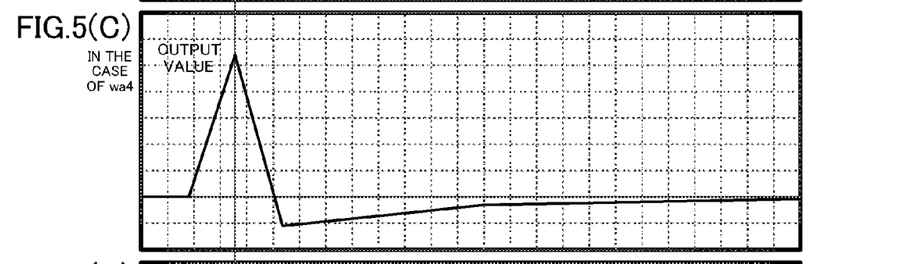
Figure 5D:
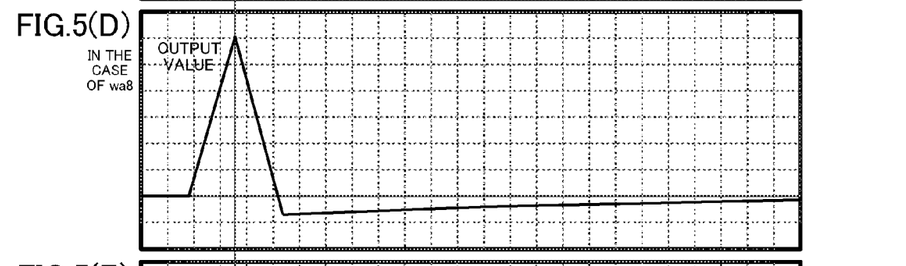
Figure 5E:
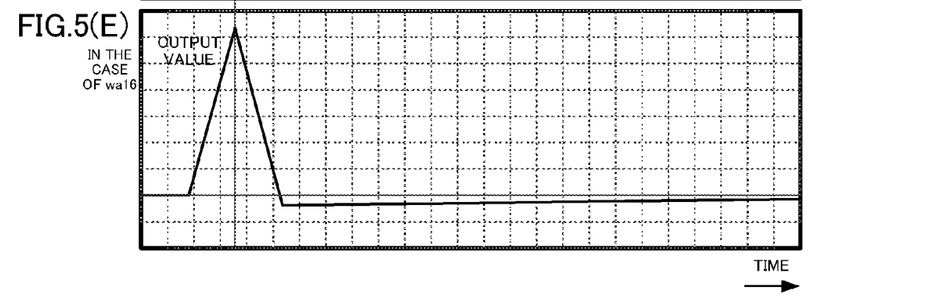

FIG. 4 shows a waveform example of an input signal (the steering torque Th), the weighted average steering torque and an output signal (the steering torque change rate, i.e. a differential used in the present invention) of the steering torque change rate extracting section 41 of the present invention, and a conventional approximation differential (i.e. a conventional one difference)-sample which is used for comparing with the differential used in the present invention.

It is clear from FIG. 4 that although the responsiveness of the present invention is inferior in comparison with the conventional approximation differential (the conventional one-sample difference), the present invention can approximately extract only the change in the inputted steering torque Th. Therefore, in comparison with the conventional approximation differential, a trade-off between increasing the responsiveness of steering and too high responsiveness cannot occur easily in the present invention.

The present invention is capable of selecting a gradient (a frequency) of the steering torque change rate desired to be extracted by the steering torque change rate extracting section 41 in accordance with characteristics of the vehicle and the column shaft by tuning a rate of weighted-averaging (i.e. the responsiveness of signal, hereinafter, also referred to as "a weighted-averaging rate").

Figure 6:
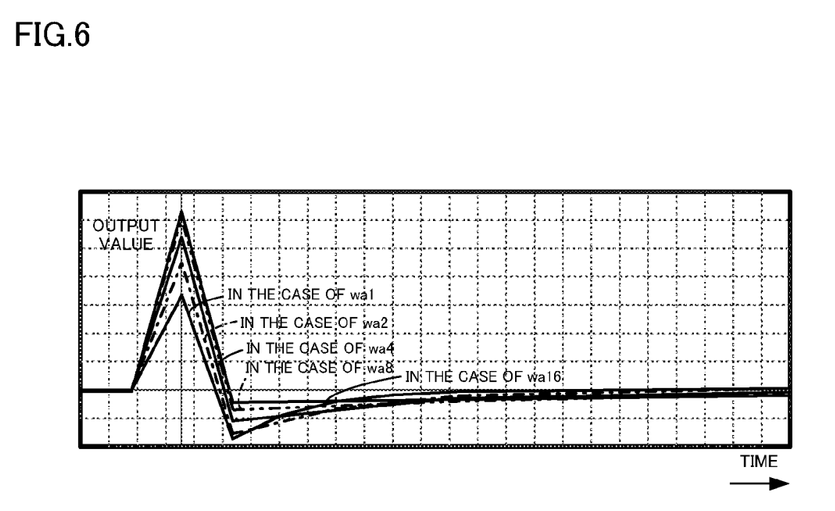
FIG. 6 is a graph obtained by superposing the waveform examples of the output signal that are shown in FIGS. 5(A), 5(B), 5(C), 5(D) and 5(E)

FIGS. 5(A), 5(B), 5(C), 5(D) and 5(E) are graphs showing waveform examples of the output signal (the outputted steering torque change rate, i.e. the differential used in the present invention) in the case of weighted-averaging the input signal (the inputted steering torque Th) with different weighted-averaging rates (weighted-averaging rates wa1, wa2, wa4, wa8 and wa16) in the steering torque change rate extracting section 41 of the present invention. Further, FIG. 6 is a graph obtained by superposing the waveform examples of the output signal that are shown in FIGS. 5(A), 5(B), 5(C), 5(D) and 5(E). Moreover, the order of the value of the weighted-averaging rate is wa1<wa2<wa4<wa8<wa16.

It is clear from FIGS. 5(A), 5(B), 5(C), 5(D) and 5(E) and FIG. 6 that in the steering torque change rate extracting section 41 of the present invention, the smaller the weighted-averaging rate is, the more the output signal of the steering torque change rate extracting section 41 gets close to the conventional approximation differential, and the larger the weighted-averaging rate is, the more the output signal of the steering torque change rate extracting section 41 gets close to the input signal (the steering torque Th) of the steering torque change rate extracting section 41. This is similar to applying a high-pass filter with an arbitrary cutoff frequency to the input signal (the steering torque Th) of the steering torque change rate extracting section 41 or applying a low-pass filter with an arbitrary cutoff frequency to the signal of the conventional approximation differential.

Further, in the present invention, it is preferred that the input signal (the inputted steering torque Th) of the steering torque change rate extracting section 41 is a steering torque within the micro steering torque range in the vicinity of on-center. Moreover, in the present invention, it is preferred that the input signal (the inputted steering torque Th) of the steering torque change rate extracting section 41 belongs to the torque range being equal to or less than the static friction torque of the reduction mechanism.

Furthermore, in the present invention, since the phase of high-frequency of the steering torque change rate (the differential used in the present invention) extracted by the steering torque change rate extracting section 41 does not advance like the conventional approximation differential, hence, it is impossible to use the present invention for the purpose of ensuring the stability of the control. In the case that ensuring the stability of the control is also one of the purposes, for example, only having to separately ensure or provide a stabilizing element by further setting a minimum necessary center responsiveness gain in the static friction compensating section 40 of the present invention, it becomes possible to use the present invention for the purpose of ensuring the stability of the control.

Figure 7:
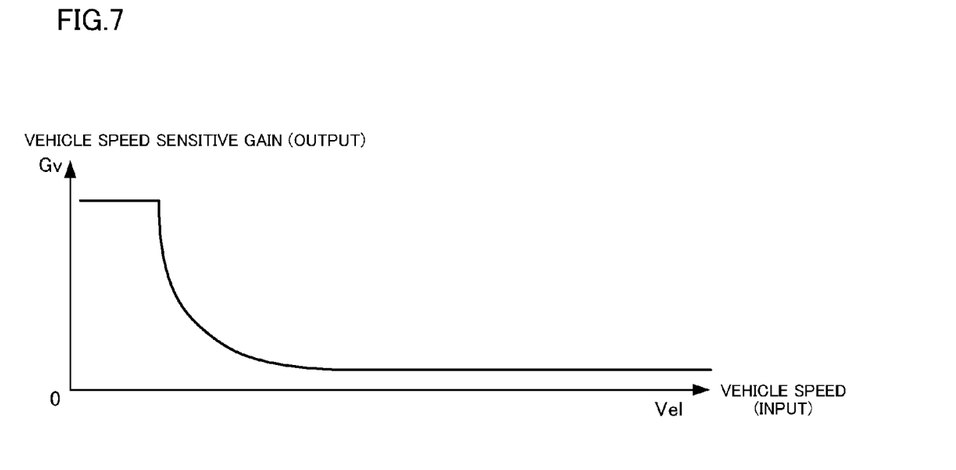
FIG. 7 is a characteristic diagram showing a characteristic example of a vehicle speed sensitive gain section according to the present invention.

The vehicle speed sensitive gain section 42 inputs the vehicle speed Vel, calculates the vehicle speed sensitive gain Gv on the basis of the inputted vehicle speed Vel and by means of a characteristic such as a characteristic shown in FIG. 7, and outputs the calculated vehicle speed sensitive gain Gv to the multiplying section 44. In this way, since the vehicle speed sensitive gain section 42 of the present invention calculates the vehicle speed sensitive gain Gv from the vehicle speed Vel, it is possible to absorb a change in the steering feeling due to the vehicle speed difference. Moreover, in the present invention, the characteristic used in the vehicle speed sensitive gain section 42 is not limited to the characteristic shown in FIG. 7, for example, it is also possible to use a characteristic of linear decreasing as the characteristic used in the vehicle speed sensitive gain section 42.

Since the object of the present invention is to reduce the friction feeling in the vicinity of on-center, in particular, to reduce the static friction uncomfortable feeling in the vicinity of on-center, and also, since the vehicle speed is unrelated to the friction, the present invention does not originally need the vehicle speed sensitive gain based on the vehicle speed.

However, since the friction of the reduction mechanism varies depending on variability and individual differences of products, a change in temperature etc., it is impossible to compensate only the friction with respect to all products manufactured. Further, the self-aligning torque (SAT) in the vicinity of on-center considerably varies depending on the vehicle speed and so on.

Hence, as described above, in the present invention, by providing the static friction compensating section 40 with the vehicle speed sensitive gain section 42, it becomes possible to set the gain corresponding to the vehicle speed (the vehicle speed sensitive gain Gv), and furthermore it becomes possible to adjust the vehicle response due to the vehicle speed difference, the friction feeling and the steering feeling.

Figure 8:
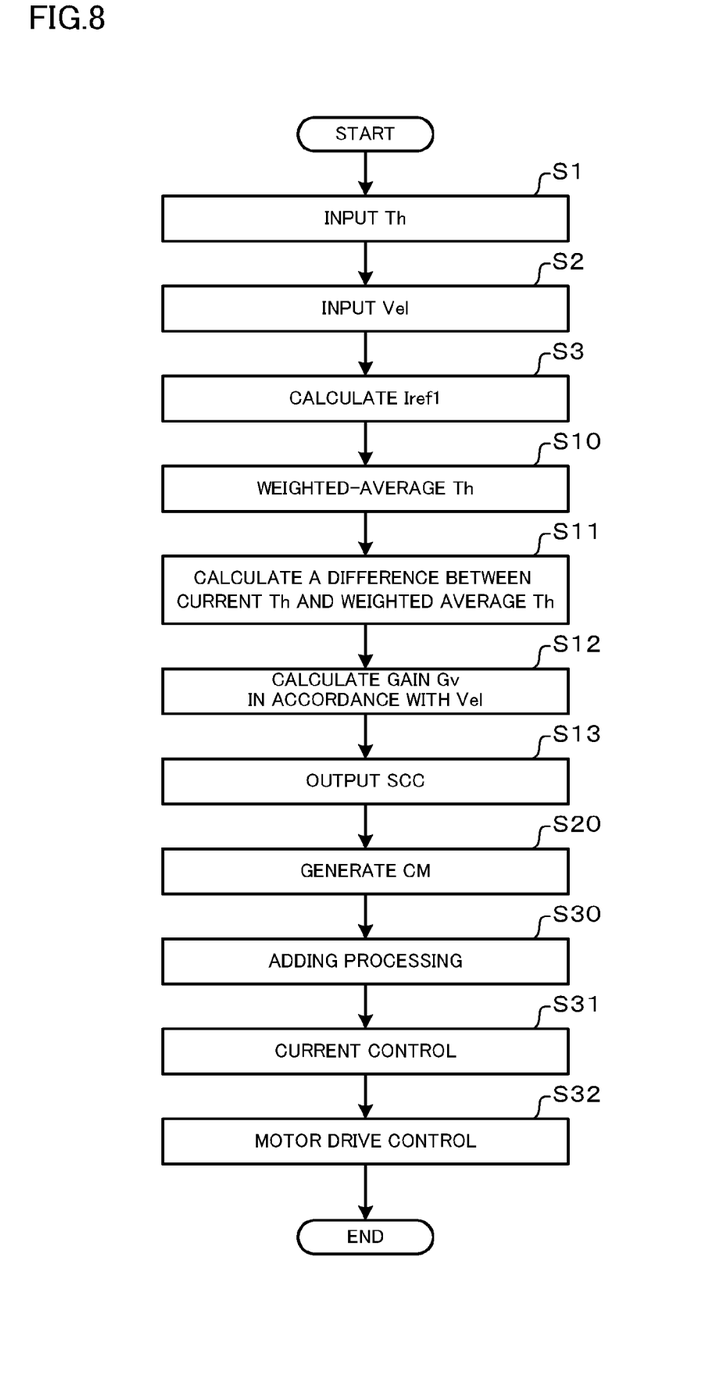
FIG. 8 is a flow chart showing an operation example of the present invention.

In such a configuration, an operation example of the present invention will be described with reference to a flow chart shown in FIG. 8.

At first, the steering torque Th is inputted (step S1), the vehicle speed Vel is inputted (step S2), and the current command value calculating section 31 calculates the current command value Iref1 (step S3).

Next, the static friction compensating section 40 weighted-averages the steering torque Th by means of the steering torque change rate extracting section 41 (step S10), calculates the difference between the steering torque Th (current steering torque Th) and the weighted average steering torque as the steering torque change rate (step S11), further, calculates the vehicle speed sensitive gain Gv in accordance with the vehicle speed Vel and by means of the vehicle speed sensitive gain section 42 (step S12), and moreover, outputs the static friction compensation command value SCC obtained by multiplying the steering torque change rate calculated by the steering torque change rate extracting section 41 by the vehicle speed sensitive gain Gv calculated by the vehicle speed sensitive gain section 42 by means of the multiplying section 44 to the adding section 32C (step S13).

Furthermore, as described above, the compensation signal generating section 34 generates the compensation signal CM based on the convergence 341, the inertia 342 and the SAT 343 and outputs the generated compensation signal CM (step S20).

Moreover, in the present invention, after inputting the steering torque Th and the vehicle speed Vel (step S1 and step S2), it is possible to appropriately change the order of calculating the current command value Iref1 (step S3), calculating the static friction compensation command value SCC (step S10, step S11, step S12 and step S13) and generating the compensation signal CM (step S20).

The current command value Iref1, the static friction compensation command value SCC and the compensation signal CM that are obtained as described above, are inputted into the adding section 32C to perform an adding processing so as to generate the current command value Iref2 (step S30). As described above, the current command value Iref2 is limited by means of the current limiting section 33 and then the current control is performed (step S31) so as to drive-control the motor 20 (step S32).

EXPLANATION OF REFERENCE NUMERALS 1 steering wheel (handle)
2 column shaft (steering shaft, handle shaft)
10 torque sensor
12 vehicle speed sensor
14 steering angle sensor
20 motor
30 control unit (ECU)
31 current command value calculating section
33 current limiting section
34 compensation signal generating section
35 PI control section
36 PWM control section
37 inverter circuit
40 static friction compensating section
41 steering torque change rate extracting section
42 vehicle speed sensitive gain section
44 multiplying section
50 CAN

The invention claimed is:

1. An electric power steering apparatus that drive-controls a motor for providing a steering mechanism with a steering assist force by means of a current command value calculated based on at least a steering torque, comprising:
a static friction compensating section that calculates a static friction compensation command value for compensating static friction of said steering mechanism based on said steering torque which is a steering torque within a micro steering torque range in the vicinity of on-center and a vehicle speed,
wherein said current command value is corrected with said static friction compensation command value,
wherein said static friction compensating section comprises:
a vehicle speed sensitive gain section that calculates a vehicle speed sensitive gain to be decided depending on said vehicle speed, and a steering torque change rate extracting section that extracts a steering torque change rate based on said steering torque, and multiplies said vehicle speed sensitive gain calculated by said vehicle speed sensitive gain section by said steering torque change rate extracted by said steering torque change rate extracting section to generate said static friction compensation command value, wherein said steering torque change rate extracting section:

obtains a weighted average steering torque by weighted-averaging said steering torque, calculates a difference between said steering torque and obtained said weighted average steering torque, and sets calculated said difference as said steering torque change rate.

2. The electric power steering apparatus according to claim 1, wherein said steering torque change rate extracting section tunes a rate of weighted-averaging so as to be capable of selecting a gradient of a steering torque change rate desired to be extracted in accordance with characteristics of a vehicle and a column shaft.

3. The electric power steering apparatus according to claim 2, wherein said vehicle speed sensitive gain section sets said vehicle speed sensitive gain in accordance with said vehicle speed so as to be capable of adjusting a vehicle response due to a vehicle speed difference, a friction feeling and a steering feeling.

4. The electric power steering apparatus according to claim 1, wherein said vehicle speed sensitive gain section sets said vehicle speed sensitive gain in accordance with said vehicle speed so as to be capable of adjusting a vehicle response due to a vehicle speed difference, a friction feeling and a steering feeling.

5. An electric power steering apparatus that drive-controls a motor for providing a steering mechanism with a steering assist force by means of a current command value calculated based on at least a steering torque, comprising:

a static friction compensating section that calculates a static friction compensation command value for compensating static friction of said steering mechanism based on said steering torque which belongs to a torque range being equal to or less than a static friction torque of a reduction mechanism and a vehicle speed, wherein said current command value is corrected with said static friction compensation command value, wherein said static friction compensating section comprises:

a vehicle speed sensitive gain section that calculates a vehicle speed sensitive gain to be decided depending on said vehicle speed, and a steering torque change rate extracting section that extracts a steering torque change rate based on said steering torque, and multiplies said vehicle speed sensitive gain calculated by said vehicle speed sensitive gain section by said steering torque change rate extracted by said steering torque change rate extracting section to generate said static friction compensation command value, wherein said steering torque change rate extracting section:

obtains a weighted average steering torque by weighted-averaging said steering torque, calculates a difference between said steering torque and obtained said weighted average steering torque, and sets calculated said difference as said steering torque change rate.

6. The electric power steering apparatus according to claim 5, wherein said steering torque change rate extracting section tunes a rate of weighted-averaging so as to be capable of selecting a gradient of a steering torque change rate desired to be extracted in accordance with characteristics of a vehicle and a column shaft.

7. The electric power steering apparatus according to claim 6, wherein said vehicle speed sensitive gain section sets said vehicle speed sensitive gain in accordance with said vehicle speed so as to be capable of adjusting a vehicle response due to a vehicle speed difference, a friction feeling and a steering feeling.

8. The electric power steering apparatus according to claim 5, wherein said vehicle speed sensitive gain section sets said vehicle speed sensitive gain in accordance with said vehicle speed so as to be capable of adjusting a vehicle response due to a vehicle speed difference, a friction feeling and a steering feeling.

* * * * *